H. WOOD.
TIRE.
APPLICATION FILED SEPT. 5, 1913.
1,100,810.
Patented June 23, 1914.
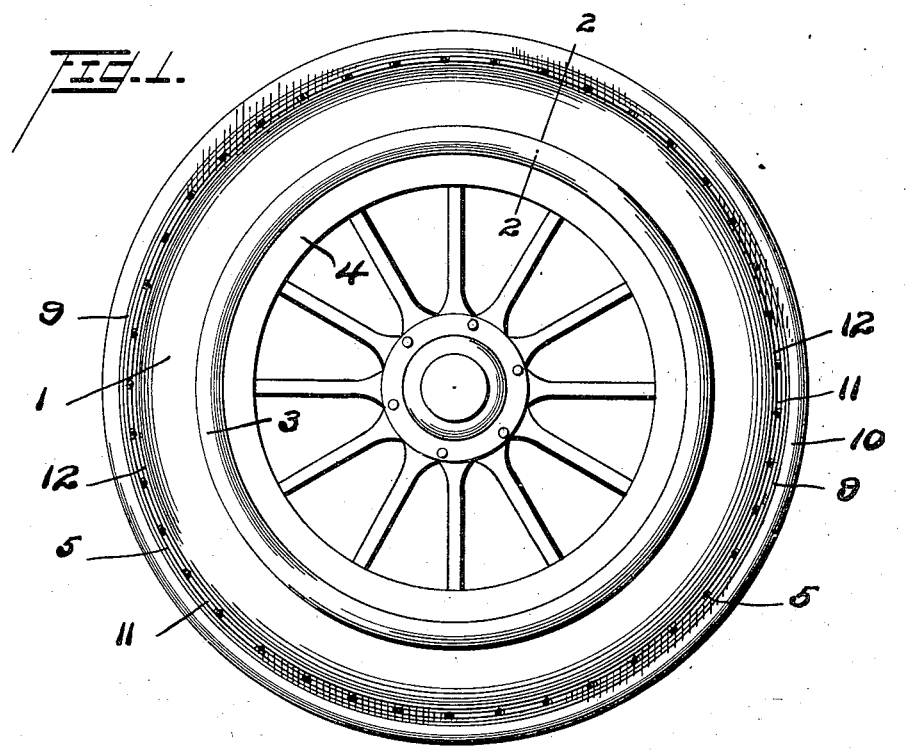
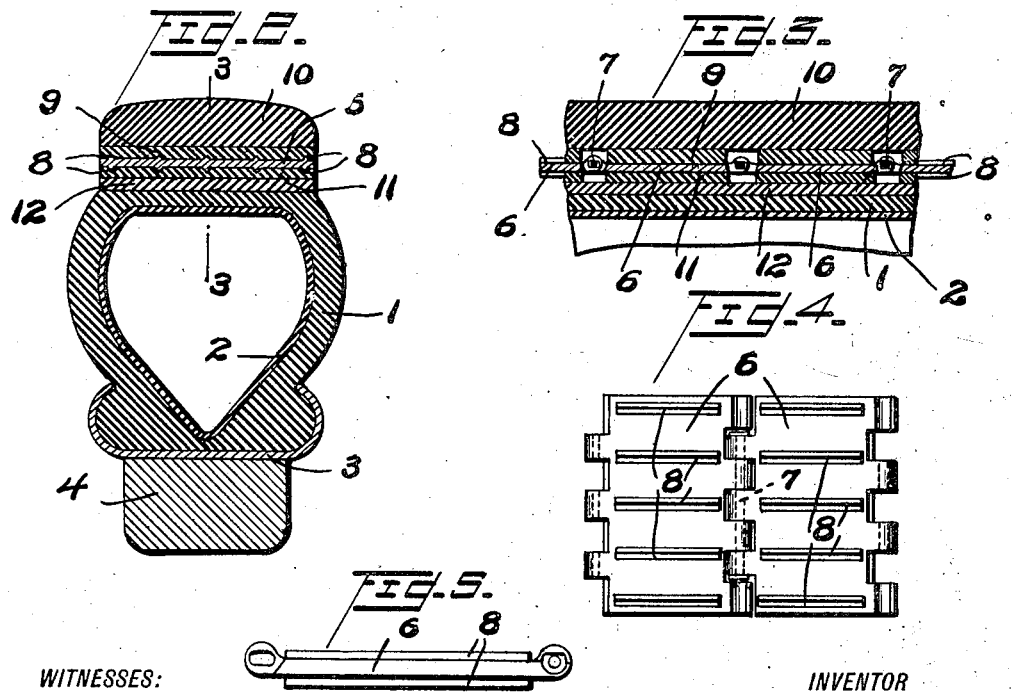
WITNESSES:
Harold Straus
C. R. Ziegler.
INVENTOR
Harry Wood
BY
Joshua R. H. Potts.
ATTORNEY

UNITED STATES PATENT OFFICE.

HARRY WOOD, OF PHILADELPHIA, PENNSYLVANIA.

TIRE.

1,100,810. Specification of Letters Patent. Patented June 23, 1914.

Application filed September 5, 1913. Serial No. 788,205.

*To all whom it may concern:*

Be it known that I, HARRY WOOD, a citizen of the United States, residing at Philadelphia, in the county of Philadelphia and State of Pennsylvania, have invented certain new and useful Improvements in Tires, of which the following is a specification.

My invention relates to improvements in tires, the object of the invention being to provide an improved tire in which a metal armor is securely held, rendering the tire puncture-proof yet not materially affecting the resiliency thereof.

A further object is to provide in the tread portion of a shoe or tire, a metal ring preferably made in hinged sections secured at opposite sides by sections of hard rubber with sections of soft rubber, all of said parts vulcanized together forming in effect a single integral mass.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improved tire. Fig. 2 is an enlarged view in section on the line 2—2 of Fig. 1. Fig. 3 is a fragmentary view in section on the line 3—3 of Fig. 2. Fig. 4 is a plan view of two sections of the metal ring, and Fig. 5 is a side elevation of one section of the metal ring on an enlarged scale.

1 represents a shoe of the ordinary type inclosing an inner tube 2, and located in a rim 3 on a wheel felly 4, and I would have it understood that while I illustrate an ordinary type of shoe and tire, that my invention is not limited in this respect.

5 represents a sectional metal ring. This ring 5 comprises a plurality of sections 6, all sections being precisely alike and connected at their adjacent ends by hinge pins 7, and provided on their inner and outer surfaces with webs 8. The metal ring 5 is provided on its outer surface with a thickness of hard rubber 9 which connects the metal with a soft rubber tread 10. The inner surface of the metal is connected by a thickness of hard rubber 11 with a thickness of soft rubber 12, which connects with the shoe. The shoe is preferably of the ordinary type with its canvas reinforcement, so that the soft rubber thickness 12 operates to rigidly connect the parts together.

As seen most clearly in Fig. 3, it will be noted that the thicknesses of hard rubber 9 and 11 are provided with spaces at opposite sides of the metal ring at the hinge pins 7, so that the metal ring is free to bend or give so as not to affect the resiliency of the tire.

In constructing the tire, the parts are all vulcanized together, the hard rubber 9 and 11 operating as a binding agent to rigidly connect the soft rubber at both sides of the metal ring to the metal ring, and while I have illustrated longitudinal webs 8, I would have it understood that the surface of the metal may be made in any desired way which will afford a permanent grip for the hard rubber. It will therefore be noted that the shoe 1 is provided with a tread containing a metal ring which is permanently connected to an outer soft rubber tread 10 and to the inner shoe by a soft rubber thickness 12 by means of the hard rubber at both sides of the metal ring and by reason of this structure, I render the tire practically puncture-proof without destroying the resiliency thereof, and construct the tire in which all of the parts are permanently adhering one to the other to produce in effect an integral structure.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A tire having a metal ring embedded in its tread portion with hard rubber at inner and outer surfaces thereof, said metal ring composed of sections hinged together, and said hard rubber formed in sections spaced apart at opposite sides of the hinge connection of the ring sections, substantially as described.

2. A tire having a metal ring embedded in its tread portion with hard rubber at inner and outer surfaces thereof, soft rubber adjacent the hard rubber, all of said parts vulcanized together, said metal ring composed of sections hinged together, and said hard rubber formed in sections spaced apart at opposite sides of the hinge pins of the ring sections, substantially as described.

In testimony whereof I have signed my name to this specification in the presence of two subscribing witnesses.

HARRY WOOD.

Witnesses:
M. E. DITTUS,
CHAS. E. POTTS.